US012626994B2

(12) United States Patent
Zhao et al.

(10) Patent No.: US 12,626,994 B2
(45) Date of Patent: May 12, 2026

(54) CONSTRAINING APPARATUS AND CONSTRAINING DEVICE

(71) Applicant: CONTEMPORARY AMPEREX TECHNOLOGY (HONG KONG) LIMITED, Hong Kong (CN)

(72) Inventors: Jiayi Zhao, Ningde (CN); Fangyu Huang, Ningde (CN); Zhiguo Zhang, Ningde (CN); Sheng Tang, Ningde (CN); Zhihui Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 611 days.

(21) Appl. No.: 18/193,027

(22) Filed: Mar. 30, 2023

(65) Prior Publication Data

US 2024/0097265 A1 Mar. 21, 2024

(30) Foreign Application Priority Data

Sep. 19, 2022 (CN) .......................... 202222468050.5

(51) Int. Cl.
*H01M 50/264* (2021.01)
*H01M 50/289* (2021.01)

(52) U.S. Cl.
CPC ....... *H01M 50/264* (2021.01); *H01M 50/289* (2021.01)

(58) Field of Classification Search
None
See application file for complete search history.

(56) References Cited

U.S. PATENT DOCUMENTS

| | | | |
|---|---|---|---|
| 10,388,934 | B2 | 8/2019 | Inoue et al. |
| 2009/0061299 | A1 | 3/2009 | Uchida et al. |

(Continued)

FOREIGN PATENT DOCUMENTS

| | | |
|---|---|---|
| DE | 10 2013 020 860 A1 | 6/2015 |
| EP | 2 031 672 A1 | 3/2009 |

(Continued)

OTHER PUBLICATIONS

European Office Action for Application No. 23163892.5, mailed on Jun. 20, 2024, 5 pages.

(Continued)

*Primary Examiner* — Wyatt P Mcconnell
(74) *Attorney, Agent, or Firm* — Ladas & Parry, LLP

(57) ABSTRACT

A constraining apparatus and a constraining device are described. The constraining apparatus includes a base, a positioning assembly, and a cushion assembly. The positioning assembly includes a plurality of positioning members arranged in sequence and located between two end plate assemblies. The cushion assembly is disposed on at least one of two sides of the positioning member that are opposite each other in the first direction. The constraining apparatus includes a first state and a second state, where in the first state, adjacent two of the positioning members abut against each other, such that an accommodating space for accommodating a battery cell is formed between the adjacent two of the positioning members, and the cushion assembly is configured to abut against the battery cell and the positioning members. In the second state, the plurality of positioning members are spaced apart from each other in the first direction.

15 Claims, 5 Drawing Sheets

(56)       References Cited

U.S. PATENT DOCUMENTS

2016/0308242 A1    10/2016  Ju
2017/0133705 A1*    5/2017  Niwa .................. H01M 50/291
2017/0358788 A1    12/2017  Inoue et al.
2018/0138560 A1     5/2018  Bessho
2019/0081295 A1     3/2019  Nishimura

FOREIGN PATENT DOCUMENTS

EP          3 082 176  A1    10/2016
EP            3121868  A1     1/2017

OTHER PUBLICATIONS

European Search Report, dated Feb. 9, 2024, corresponding to EP
Application No. 23163892-5.

* cited by examiner

CONSTRAINING APPARATUS AND CONSTRAINING DEVICE

CROSS-REFERENCE TO RELATED APPLICATION

This application claims priority to Chinese Patent Application No. 202222468050.5 entitled "Constraining Apparatus and Constraining Device" filed on Sep. 19, 2022. This application is incorporated herein by reference in its entirety.

TECHNICAL FIELD

This application relates to the field of battery technologies, and in particular, to a constraining apparatus and a constraining device that are applied to battery cells.

BACKGROUND

Both formation and grading processes for battery cell production relate to charging and discharging of battery cells. In these two processes, excess gas is easily generated inside battery cells. If the gas is not fully discharged, the defect rate of battery cells will increase. To alleviate this problem, battery cells need to be constrained to promote discharge of gas inside the battery cells.

In related art, constraining trays are generally used to constrain battery cells. However, the constraining effect of existing constraining trays is unsatisfying, so the gas inside the battery cells cannot be fully discharged, thus failing to significantly alleviate the defect rate of battery cells. Therefore, it is urgent to develop a constraining apparatus, which provides good constraining effects for a lower defect rate of battery cells.

SUMMARY

This application provides a constraining apparatus and a constraining device, intended to improve the constraining effect of the constraining apparatus and decrease the defect rate of battery cells.

According to a first aspect, this application provides a constraining apparatus, applied to constrain a battery cell. The constraining apparatus includes a base, a positioning assembly, and a cushion assembly. The base includes a support assembly, a guide assembly, and two end plate assemblies, where the two end plate assemblies are respectively connected to two ends of the support assembly that are opposite each other in a first direction. The guide assembly extends in the first direction and is connected to the two end plate assemblies. The positioning assembly includes a plurality of positioning members arranged in sequence in the first direction and located between two end plate assemblies, where the plurality of positioning members are movably connected to the guide assembly in the first direction, and adjacent two of the positioning members are fitted to each other in the first direction. The cushion assembly is disposed on at least one of two sides of the positioning member that are opposite each other in the first direction. The constraining apparatus includes a first state and a second state, where in the first state, adjacent two of the positioning members abut against each other, such that an accommodating space for accommodating a battery cell is formed between the adjacent two of the positioning members, and the cushion assembly is configured to abut against the battery cell and the positioning members; and in the second state, the plurality of positioning members are spaced apart from each other in the first direction.

The constraining apparatus includes the first state and the second state. The first state is a state of exerting constraint on the battery cell, and the second state is a state of releasing constraint on the battery cell. The constraining apparatus can freely switch between the first state and the second state by moving the positioning member. Under the condition that the constraining apparatus is in the first state, the cushion assembly abuts against the battery cell and the positioning members, and the cushion assembly has an elastic force, which can be converted into a constraining force on the battery cell. In this case, the battery cell is always subject to the constraining force applied by the cushion assembly in a gas discharging process, and the gas inside the battery cell can be fully discharged. This greatly improves the constraining effect of the constraining apparatus and decreases a defect rate of battery cells. Under the condition that the constraining apparatus is in the second state, gaps are present between the plurality of positioning members, facilitating loading and unloading of the battery cells.

In some implementations, the positioning assembly is provided in plurality, where the plurality of positioning assemblies are disposed successively in a second direction, and the second direction is perpendicular to the first direction.

Such arrangement of the plurality of positioning assemblies can increase a quantity of the battery cells constrained by the constraining apparatus in one constraint, improving the constraining efficiency of the constraining apparatus.

In some implementations, the positioning member includes two positioning pieces and a restricting piece. The two positioning pieces are disposed opposite each other in the second direction, and are movably connected to the guide assembly in the first direction. The second direction is perpendicular to the first direction. The restricting piece is detachably connected between the two positioning pieces, and the cushion assembly is disposed on the restricting piece. An accommodating space is formed between the restricting pieces of adjacent two of the positioning members, and the cushion assembly is configured to be disposed between the restricting pieces and the battery cells.

The positioning pieces and the restricting piece in the positioning member are detachably connected, such that the positioning assembly can be replaced to adapt to different types of battery cells. This improves versatility and convenience of use of the constraining apparatus.

In some implementations, the restricting piece includes a body and two first convex portions connected to the body, where the two first convex portions respectively protrude in a direction towards the positioning pieces with respect to the body, and the body is connected to the cushion assembly. The positioning piece includes a main body and first concave portions, where the first concave portions is depressed in a direction away from the restricting pieces with respect to the main body, and the first concave portions are fitted to the first convex portions.

A detachable connection between the restricting piece and the positioning pieces is implemented through such a form of fitting between the first convex portion and the first concave portion. This connection form contributes to a simple structure, good connection stability, and good reliability.

In some implementations, the positioning piece includes a main body, a second convex portion, and a second concave portion, where the second convex portion is connected to the main body and protrudes in the first direction with respect to the main body. The second concave portion is connected to the main body, depressed in the first direction with respect to the main body, and disposed opposite the second convex portion in the first direction. In the first direction, the second convex portion of one of the two adjacent positioning pieces is fitted to the second concave portion of the other one of the two adjacent positioning pieces.

The fitting is implemented between the two adjacent positioning pieces by using the second convex portion and the second concave portion. Under the condition that the constraining apparatus is in the first state, the structural stability between the two adjacent positioning pieces can be enhanced when the two abut against each other, thereby enhancing the structural stability of the constraining apparatus during operation.

In some implementations, the restricting piece includes a body and a third convex portion connected to the body, where the third convex portion protrudes in the first direction with respect to the body and encloses a first cavity, the accommodating space is formed between the first cavities of adjacent two of the positioning members, and the cushion assembly is disposed in the first cavity.

The third convex portion can restrict and position the battery cell to some extent, enhancing the positional stability of the battery cell when the battery cell is constrained, and thereby enhancing the overall structural stability of the constraining apparatus. Moreover, the cushion assembly is disposed in the first cavity, which can also enhance the connection stability of the cushion assembly.

In some implementations, a plurality of through holes are provided on the body. A plurality of protrusions are provided on a side of the cushion assembly facing the body and embedded in the through holes.

The through holes are matched with the protrusions, such that the cushion assembly can be detachably connected to the body, thereby facilitating the disassembly and replacement of the cushion assembly. Moreover, such a connection form, in which the protrusions match the through holes, simplifies the structure, improves stability, and reduces manufacturing costs.

In some implementations, the guide assembly includes a plurality of guide shafts extending in the first direction, where the plurality of guide shafts are spaced apart from each other in a direction perpendicular to the first direction. The positioning member includes a plurality of movable portions, where each of the movable portions is movably connected to its corresponding guide shaft.

The guide assembly includes a plurality of guide shafts, which can enhance the stationarity of the positioning member moving along the guide assembly and enhance the operating stability of the constraining apparatus. In addition, the guide shafts feature simple structure, ease of manufacturing and molding, and low cost.

In some implementations, the constraining apparatus further includes a holding assembly and a jacking assembly. The holding assembly is disposed on a side of the end plate assembly close to the positioning member; and the jacking assembly is disposed on the end plate assembly and can move in the first direction with respect to the end plate assembly. In the first state, the jacking assembly is locked with the end plate assembly, and the holding assembly abuts against the jacking assembly and the positioning member; and in the second state, the jacking assembly is locked with the end plate assembly, and the jacking assembly is disengaged from the holding assembly.

Therefore, the jacking assembly can fit with the holding assembly, enabling the constraining apparatus to switch between the first state and the second state. This can simplify the operation of the constraining apparatus and improve the operation convenience of the constraining apparatus.

In some implementations, the holding assembly is movably connected to the guide assembly in the first direction.

The holding assembly is movably connected to the guide assembly, which enhances the movement stationarity of the holding assembly, thereby enhancing the overall structural stability of the constraining apparatus.

In some implementations, in the second state, the holding assembly is fitted to the end plate assembly.

The holding assembly can be fitted to the end plate assembly, such that the holding assembly and the base can be incorporated as a whole, enhancing the structural integrity of the constraining apparatus.

In some implementations, the end plate assembly includes a plurality of mounting portions, where the plurality of mounting portions are spaced apart from each other, and the jacking assembly is disposed on the mounting portion.

The end plate assembly includes the plurality of mounting portions, and can change a position of the jacking assembly according to the sizes of battery cells, such that the pressure applied by the jacking assembly can be more evenly distributed on the battery cells. In addition, a plurality of jacking assemblies may also be provided to pressurize the holding assembly so as to improve effect of constraining the battery cells.

In some implementations, the holding assembly includes a plurality of matching portions disposed opposite the mounting portion in the first direction. In the first state, the jacking assembly abuts against the matching portions; and in the second state, the jacking assembly is disengaged from the matching portions.

The matching portions are fitted to the jacking assembly, which can improve the abutment stability when the jacking assembly abuts against the holding assembly, and improve the overall structural stability of the constraining apparatus.

According to a second aspect, this application provides a constraining device, including the constraining apparatus according to any one of the implementations of the first aspect and a pressurizing apparatus. The pressurizing apparatus is configured to exert an acting force on the positioning assembly in a first sub-direction, such that the constraining apparatus is in the first state and adjacent two of the positioning members abut against each other, and the first sub-direction is parallel to the first direction.

The constraining device includes the pressurizing apparatus such that human intervention can be reduced in constraining the battery cells. This raises the automation level of the constraining device and improves the constraining efficiency.

In some implementations, the constraining device further includes a pressure relief apparatus, where the pressure relief apparatus is configured to exert an acting force on the positioning assembly in a direction opposite the first sub-direction, such that the constraining apparatus is in the second state and the positioning members are spaced apart from each other in the first direction.

The constraining device includes the pressure relief apparatus such that human intervention can be reduced in constraining the battery cells. This raises the automation level of the constraining device and improves the constraining efficiency.

In some implementations, the constraining apparatus further includes the holding assembly and the jacking assembly; and the constraining device further includes a screw tightening apparatus. The screw tightening apparatus is configured to connect to the jacking assembly, so as to drive the jacking assembly to rotate and push the holding assembly to move in the first sub-direction.

The screw tightening apparatus can press against the holding assembly, so as to maintain the compaction action on the positioning assembly and keep the constraining apparatus in the first state.

BRIEF DESCRIPTION OF DRAWINGS

The following describes features, advantages, and technical effects of the example embodiments of this application with reference to the accompanying drawings.

Figure 1:
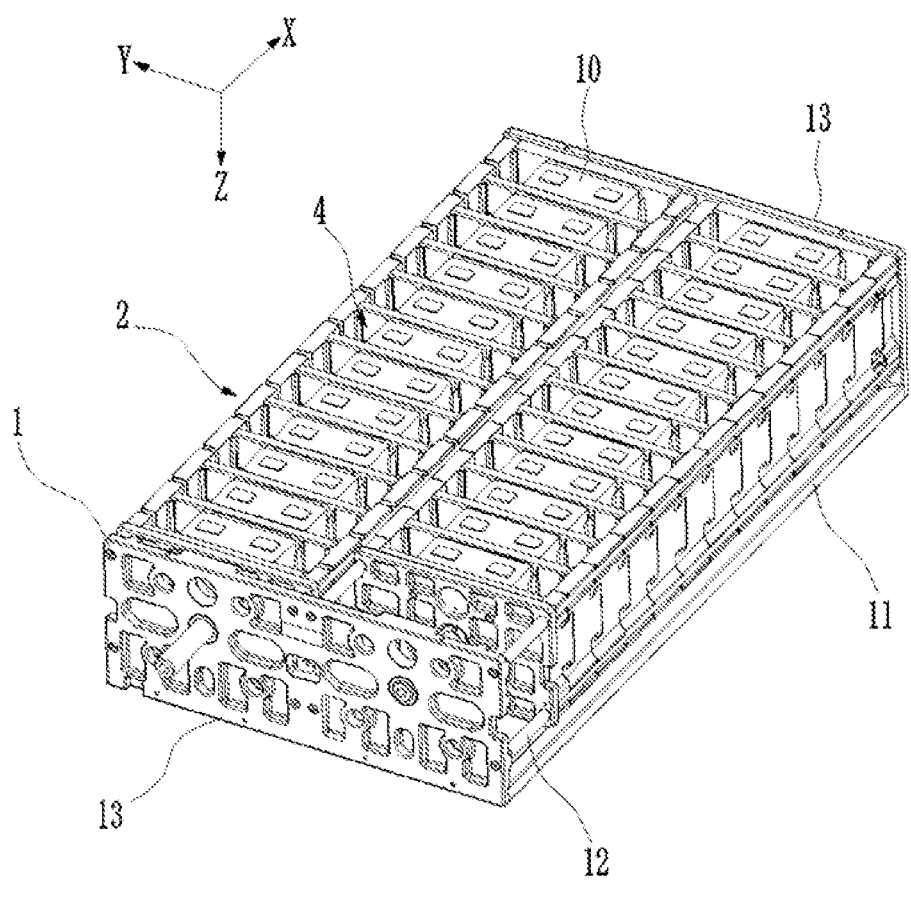
FIG. 1 is a schematic structural diagram of a constraining apparatus according to some embodiments of this application.

The figures may not be drawn to scale.

REFERENCE SIGNS IN THE FIGURES

X. first direction; Y. second direction; Z. third direction; X1. first sub-direction;

1. base; 11. support assembly; 12. guide assembly; 121. guide shaft; 13. end plate assembly; 131. mounting portion;

2. positioning assembly; 20. positioning member;

21. positioning piece; 211. main body; 212. first concave portion; 213. second convex portion; 214. second concave portion;

22. restricting piece; 221. body; 221a. through hole; 222. first convex portion; 223. third convex portion; 224. first cavity;

3. cushion assembly; 31. protrusion;

4. accommodating space; 5. holding assembly; 6. jacking assembly; 7. pressurizing apparatus; 8. pressure relief apparatus; 9. screw tightening apparatus; 10. battery cell.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "I" in this application generally indicates an "or" relationship between contextually associated objects.

In the embodiments of this application, the same reference signs denote the same members. For brevity, in different embodiments, detailed descriptions of the same members are not repeated. It should be understood that, as shown in the accompanying drawings, sizes such as thickness, length, and width of various members and sizes such as thickness, length, and width of integrated devices in the embodiments of this application are merely for illustrative purposes and should not constitute any limitations on this application.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application.

Processes such as formation and grading are generally required for production of battery cells. Battery cells are not energized when assembled. Therefore, the battery cells usually need to be charged for the first time to activate the active material inside the battery cells, and the process of first charge activation is called formation. Grading refers to a procedure of selecting qualified battery cells through capacity testing. During grading, battery cells are charged and discharged to detect discharge capacities of fully charged battery cells, so as to determine capacities of the battery cells. Only when the tested capacities reach or exceed the designed capacity, the battery cells are qualified. In the processes of formation and grading, a large amount of gas is easily generated in the battery cell. If the gas is not fully discharged, the internal air pressure of the battery cell will increase, and the battery cell will swell. As a result, the performance of battery cells does not meet the design requirements, thereby increasing the defect rate of battery cells.

In the related art, a constraining apparatus is generally configured to exert constraint on battery cells, so as to promote discharge of gas in the battery cells. However, the inventors have found through research that the existing constraining apparatuses have an unsatisfying effect in constraining the battery cells, and the gas in the battery cells is often unable to be fully discharged. Therefore, the problem of limited gas discharge cannot be alleviated significantly and the defect rate of battery cells cannot be decreased.

In view of this problem, the inventors propose a constraining apparatus. The constraining apparatus includes a plurality of cushion assemblies and a plurality of positioning members. The plurality of positioning members are movable, and an accommodating space is provided between adjacent positioning members for accommodating a battery cell. The cushion assembly abuts against the battery cell and the positioning members. The constraining apparatus includes a first state and a second state. The first state is a state of exerting constraint on the battery cell, and the second state is a state of releasing constraint on the battery cell. The constraining apparatus can freely switch between the first state and the second state by moving the positioning members. Under the condition that the constraining apparatus is in the first state, the cushion assembly abuts against the battery cell and the positioning members, and the cushion assembly has an elastic force, which is converted into a constraining force on the battery cell In this case, the battery cell is always subject to the constraining force applied by the cushion assembly in a gas discharging process, and the gas inside the battery cell can be fully discharged. This greatly improves the constraining effect of the constraining apparatus and decreases a defect rate of battery cells. Under the condition that the constraining apparatus is in the second state, gaps are present between the plurality of positioning members, facilitating loading and unloading of the battery cells.

Some embodiments of this application will be specifically described below with reference to the accompanying drawings.

Figure 2:
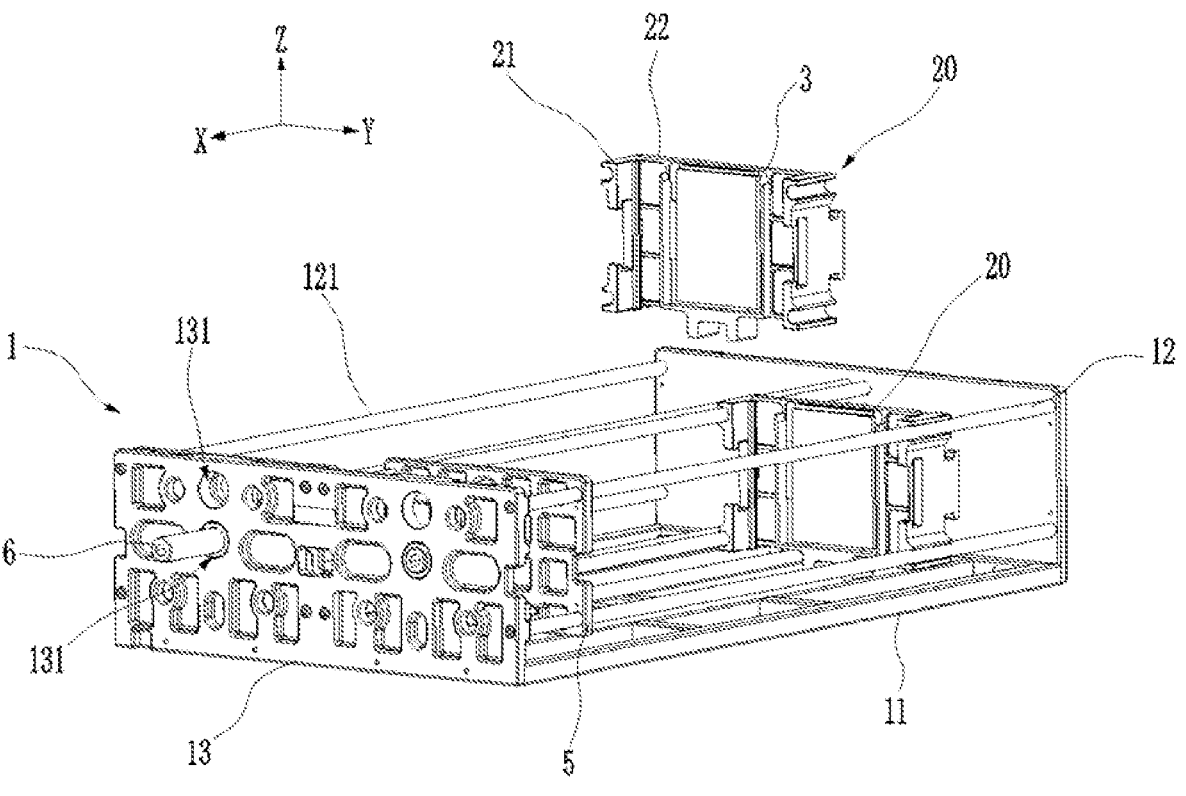
FIG. 2 is a partially exploded schematic diagram of a constraining apparatus according to some embodiments of this application.

FIG. 1 is a schematic structural diagram of a constraining apparatus according to some embodiments of this application; and FIG. 2 is a partially exploded schematic diagram of a constraining apparatus according to some embodiments of this application.

As shown in FIG. 1 and FIG. 2, the constraining apparatus includes a base 1, a positioning assembly 2, and a cushion assembly 3. The base 1 includes a support assembly 11, a guide assembly 12, and two end plate assemblies 13, where the two end plate assemblies 13 are respectively connected to two ends of the support assembly 11 that are opposite each other in a first direction X. The guide assembly 12 extends in the first direction X and is connected to the two end plate assemblies 13. The positioning assembly 2 includes a plurality of positioning members 20 arranged in sequence in the first direction X and located between two end plate assemblies 13, where the plurality of positioning members 20 are movably connected to the guide assembly 12 in the first direction X, and adjacent two of the positioning members 20 are fitted to each other in the first direction X. The cushion assembly 3 is disposed on at least one of two sides of the positioning member 20 that are opposite each other in the first direction X. The constraining apparatus includes a first state and a second state, where in the first state, adjacent two of the positioning members 20 abut against each other, such that an accommodating space 4 for accommodating a battery cell 10 is formed between the adjacent two of the positioning members 20, and the cushion assembly 3 is configured to abut against the battery cell 10 and positioning members 20; and in the second state, the plurality of positioning members 20 are spaced apart from each other in the first direction X.

The base 1 serves as the main body of the constraining apparatus, and can be provided in various structural forms, for example, a cuboid structure and a cube structure. The base 1 includes a support assembly 11, a guide assembly 12, and two end plate assemblies 13, where the support assembly 11 constitutes the supporting body of the constraining apparatus and has good structural strength and bearing capacity. The support assembly 11 may be made of metal materials, for example, alloy steel, or may be made of non-metal materials such as carbon fiber materials. The end plate assembly 13 is connected to two ends of the support assembly 11 that are opposite each other in the first direction X, and the end plate assembly 13 plays a minor role in supporting and is configured to support the positioning assembly 2 and withstand the pressure applied by the positioning assembly 2. The end plate assembly 13 may be connected to the support assembly 11 in various manners, which may be a fixed connection such as welding, or may be a detachable connection such as fitting and threaded connection. In some examples, the support assembly 11 is formed by welding a plurality of steel pipes in an interlacing mode, the end plate assembly 13 is a solid steel plate provided with a hollow groove and reinforcing ribs, and the two are welded together.

The guide assembly 12 is connected between the two end plate assemblies 13. The guide assembly 12 can have various structural forms, for example, it may be a guide shaft or a guide rod; the guide assembly 12 and the end plate assembly 13 may be fixedly connected, for example, a welded connection, or may be detachably connected, for example, a fitting and threaded connection.

The positioning assembly 2 is a main functional part of the constraining apparatus to exert constraint, and is configured to exert constraint on the battery cell 10. The positioning assembly 2 includes a plurality of positioning members 20. The plurality of positioning members 20 are arranged in sequence in the first direction X, and are movably connected to the guide assembly 12 in the first direction X. The movable connection in the first direction X means that the positioning members 20 are connected to the guide assembly 12, and can also move in the first direction X with respect to the guide assembly 12. When adjacent two of the positioning members 20 abut against each other, an accommodating space 4 is formed therebetween. The accommodating space 4 is space where the battery cell 10 is located when constrained. The battery cell 10 disposed therein is able to be constrained. A size of the accommodating space 4 is relevant to the positioning member 20. If a length of the positioning member 20 in the first direction X is large, the accommodating space 4 formed through the abutment of adjacent two of the positioning members 20 is also large. The size of the accommodating space 4 can be predetermined based on a volume of the battery cell 10.

The positioning member 20 is provided with a cushion assembly 3, and the cushion assembly 3 is disposed on at least one of the two sides of the positioning member 20 that are opposite each other in the first direction X. It can be understood that, in some positioning members 20, the cushion assemblies 3 are respectively disposed on the two sides of the positioning member 20 that are opposite each other in the first direction X. In other words, one positioning member 20 is provided with two cushion assemblies 3. In other positioning members 20, the cushion assemblies 3 are disposed on one of the two sides the positioning member 20 that are opposite each other in the first direction X, in other words, one positioning member 20 is provided with one cushion assembly 3. The cushion assembly 3 may be disposed based on the position of the battery cell 10. For example, the battery cell 10 is not placed on a side facing the end plate assembly 13 for some of the positioning members 20, so the cushion assembly 3 may not be provided on such side, and the battery cell 10 is disposed on each of two sides in the first direction X for some of the positioning members 20, so the cushion assembly 3 may be disposed on each of two sides of the positioning member 20.

The cushion assembly 3 is disposed on the positioning member 20 and may be fixedly connected to the positioning member 20, for example, by means of bonding, or may be detachably connected to the positioning member 20, for example, being fitted to the positioning member 20. The cushion assembly 3 has a cushioning effect and can deform when stressed, and it can return to the original state from deformation. The cushion assembly 3 may be made of various materials, for example, sponge, rubber, or latex, or may be an elastic piece, for example, a spring. The cushion assembly 3 is configured to be in direct contact with the battery cell 10, which can provide flexible protection for the battery cell 10, reducing the probability of the battery cell 10 being squeezed and damaged. In addition, a constant constraining force can be applied on the battery cell 10 depending on the elastic force of the cushion assembly 3 when the battery cell 10 is being constrained, thereby improving the constraining effect of the constraining apparatus.

Under the condition that the battery cell 10 is being constrained, as the constraining time prolongs, the cushion assembly 3 tends to return to the original state from deformation. In this case, the accommodating space 4 will gradually decrease. This is because in the process of being constrained, the volume of battery cell 10 may decrease invisible to the naked eye with the discharge of internal gas, and then the cushion assembly 3 connected to the battery cell 10 will slightly swell, resulting in the decrease of the accommodating space 4.

The constraining apparatus includes a first state and a second state. The first state is a state of exerting constraint on the battery cell 10 by the constraining apparatus, and the second state is a state of releasing constraint on the battery cell. The constraining apparatus can switch between the first state and the second state by changing positions of the positioning members 20. When the constraining apparatus is in the first state, the positioning members 20 abut against each other, and the battery cell 10 is compressed, which prompts the battery cell 10 to discharge gas. When the constraining apparatus is in the second state, gaps are present between the positioning members 20, the battery cell 10 is not subject to the constraining force, and the battery cell 10 can be easily loaded and unloaded.

Under the condition that the constraining apparatus of this embodiment of this application is in the first state, the cushion assembly 3 abuts against the battery cell 10 and the positioning members 20, and the cushion assembly 3 has an elastic force, which can be converted into a constraining force on the battery cell 10. In this case, the battery cell 10 is always subject to the constraining force applied by the cushion assembly 3 in the constraining process, and the gas inside the battery cell 10 can be fully discharged. The constraining apparatus of this embodiment of this application greatly improves the effect of constraining the battery cell 10 and decreases the defect rate of producing battery cells 10.

A shown in FIG. 1 and FIG. 2, in some embodiments, a plurality of positioning assembly 2 are provided, where the plurality of positioning assemblies 2 are disposed successively in a second direction Y, and the second direction Y is perpendicular to the first direction X.

The plurality of positioning assemblies 2 being disposed successively in the second direction Y can be understood that, in the second direction Y, adjacent two of the positioning assemblies 2 may be spaced apart from each other or may be in contact with each other. For example, in FIG. 1, a gap is present between adjacent two of the positioning assemblies 2.

Such arrangement of the plurality of positioning assemblies 2 can increase a quantity of the battery cells 10 constrained by the constraining apparatus in one constraint, improving the constraining efficiency of the constraining apparatus.

Figure 3:
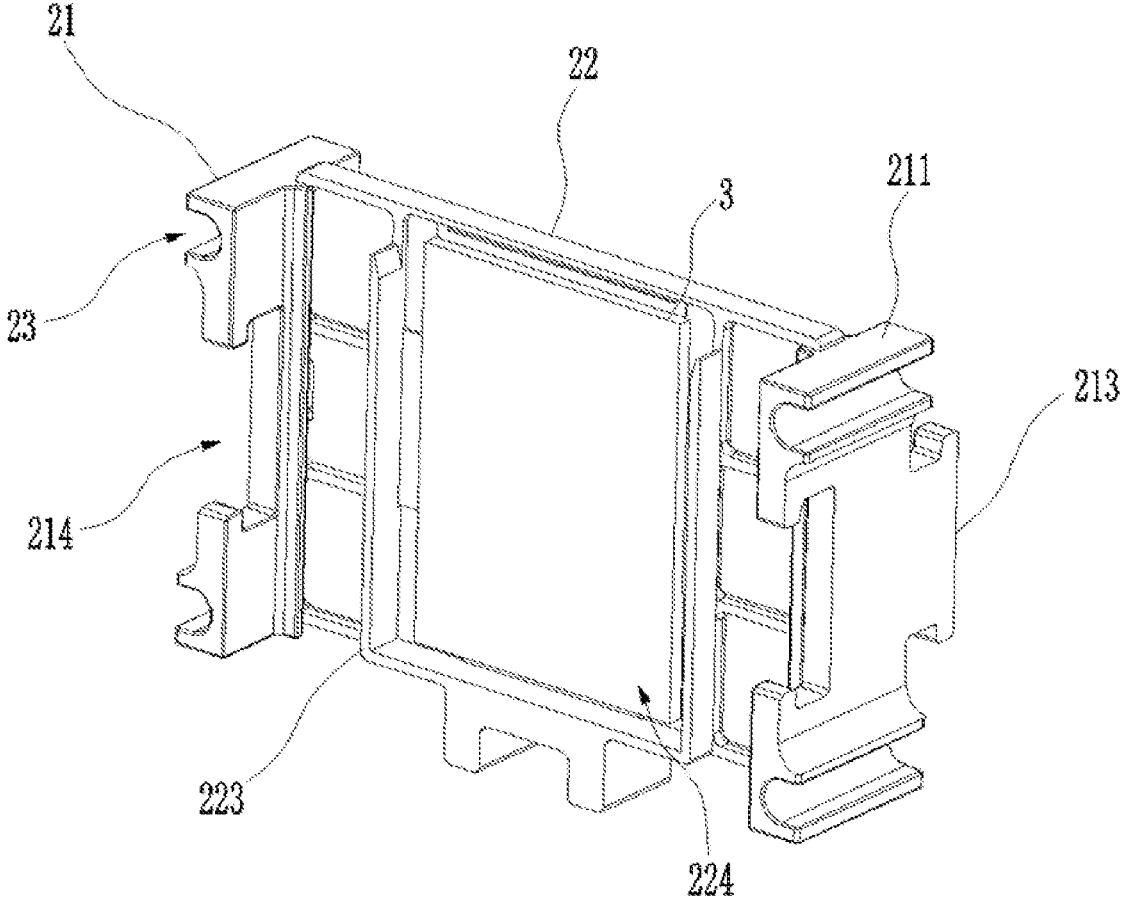
FIG. 3 is a schematic structural diagram of a positioning member and a cushion assembly of a constraining apparatus that are in an assembled state according to some embodiments of this application.
Figure 4:
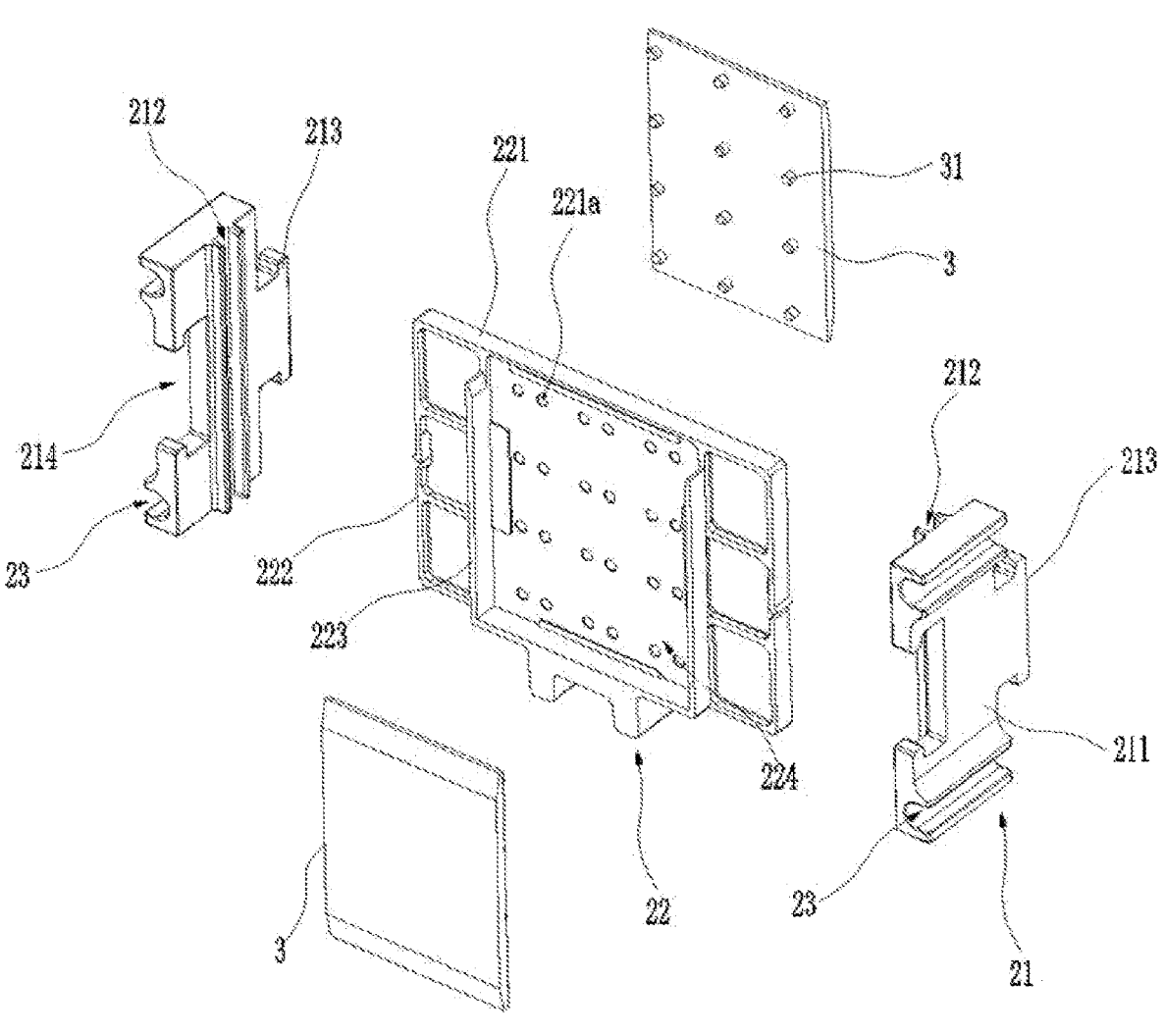
FIG. 4 is a schematic structural diagram of a positioning member and a cushion assembly of a constraining apparatus that are in a disassembled state according to some embodiments of this application.

FIG. 3 is a schematic structural diagram of a positioning member and a cushion assembly of a constraining apparatus that are in an assembled state according to some embodiments of this application; and FIG. 4 is a schematic structural diagram of a positioning member and a cushion assembly of a constraining apparatus that are in a disassembled state according to some embodiments of this application.

As shown in FIG. 1 to FIG. 4, in some embodiments, the positioning member 20 includes two positioning pieces 21 and a restricting piece 22. The two positioning pieces 21 are disposed opposite each other in the second direction Y, and are movably connected to the guide assembly 12 in the first direction X. The second direction Y is perpendicular to the first direction X. The restricting piece 22 is detachably connected between the two positioning pieces 21, and the cushion assembly 3 is disposed on the restricting piece 22. An accommodating space 4 is formed between the restricting pieces 22 of adjacent two of the positioning members 20, and the cushion assembly 3 is configured to be disposed between the restricting pieces 22 and the battery cells 10.

The positioning pieces 21 have a positioning function. Specifically, it can be understood that, in the first direction X, two adjacent positioning pieces 21 abut against each other such that two adjacent of the positioning members 20 abut against each other. Therefore, the accommodating space 4 for accommodating the battery cells 10 can be formed between adjacent two of the restricting pieces 22 through the positioning between the two positioning pieces 21. The positioning piece 21 may be in various shapes, for example, being a rectangular plate structure or a square plate structure. The positioning piece 21 has a specific length in the first direction X, and the length can be set according to the volume of the battery cell 10. The positioning piece 21 is movably connected to the guide assembly 12 in the first direction X in various connection forms, for example, in a shaft hole sliding fit or a sliding wheel connection. For example, in FIG. 2, the positioning piece 21 is connected to the guide assembly 12 by a shaft hole sliding fit.

The restricting piece 22 is provided with a cushion assembly 3, and the cushion assembly 3 may be disposed on one side of the restricting piece 22 or on two sides of the restricting piece 22 that are opposite each other in the first direction X. The cushion assembly 3 and the restricting pieces 22 may be connected in various connection forms, for example, bonding and fitting.

In this embodiment, the positioning member 20 includes a restricting piece 22 and two positioning pieces 21, and the restricting piece 22 is detachably connected to the two positioning pieces 21. Such detachable connection facilitates the disassembly of the restricting piece 22. For different types of battery cells 10, the shape of the constraining apparatus can be changed to adapt the accommodating space 4 to the battery cells 10, such that the battery cells 10 of different types can be replaced quickly, improving the versatility and convenience of use of the constraining apparatus. For example, under the condition that thickness of the battery cell 10 is large, thin restricting pieces 22 can be used; and under the condition that thickness of the battery cell 10 is small, thick restricting pieces 22 can be used. Certainly, if thickness of the battery cell 10 is significantly larger, some of the restricting pieces 22 may alternatively be disassembled such that a plurality of accommodation spaces 4 can be merged to form a larger accommodating space for accommodating the battery cell 10.

The restricting pieces 22 are detachably connected to the two opposite positioning pieces 21, and such detachable connection may be in various forms, for example, snap-fit connection, pin-shaft connection, or threaded connection.

In some examples, the positioning piece 21 is provided with a first positioning hole, the restricting piece 22 is provided with a second positioning hole matching the first positioning hole, internal threads are provided on inner walls of the first positioning hole and the second positioning hole, and the positioning piece 21 and the restricting piece 22 can be fixedly connected through these screws.

In some other examples, a sliding slot is formed on the restricting piece 22, a sliding block matching with the sliding slot is formed on the positioning piece 21, and the restricting piece 22 matches the positioning piece 21 through the sliding block and the sliding slot.

In still some other examples, as shown in FIG. 1 to FIG. 4, the restricting piece 22 includes a body 221 and two first convex portions 222 connected to the body 221, where the two first convex portions 222 respectively protrude in a direction towards the positioning pieces 21 with respect to the body 221, and the body 221 is connected to the cushion assembly 3; and the positioning piece 21 includes a main body 211 and first concave portions 212, where the first concave portion 212 is depressed in a direction away from the restricting pieces 22 with respect to the main body 211, and the first concave portion 212 is fitted to the first convex portion 222.

Further, in these examples, a plurality of through holes 221a may be provided on the body 221; and a plurality of protrusions 31 may be provided on a side of the cushion assembly 3 facing the body 221, where the protrusions 31 are embedded in the through holes 221a. With the combination of the through holes 221a and the protrusions 31, the cushion assembly 3 can be detachably connected to the body 221, thereby facilitating the disassembly and replacement of the cushion assembly 3. Moreover, such a connection form, in which the protrusions 31 match the through holes 221a, simplifies the structure, improves stability, and reduces manufacturing costs.

As shown in FIG. 1 to FIG. 4, n some implementations, the positioning piece 21 includes a main body 211, a second convex portion 213, and a second concave portion 214, where the second convex portion 213 is connected to the main body 211 and protrudes in the first direction X with respect to the main body 211; the second concave portion 214 is connected to the main body 211, recessed in the first direction X with respect to the main body 211, and disposed opposite the second convex portion 213 in the first direction X; and in the first direction X, the second convex portion 213 of one of the two adjacent positioning pieces 21 is fitted to the second concave portion 214 of the other one of the two adjacent positioning pieces 21.

The second convex portion 213 may have various structural forms, for example, it may be a spherical convex platform structure, an arc-shaped convex platform structure, or a square convex platform structure. The second concave portion 214 may be set according to the shape of the second convex portion 213. For example, if the second convex portion 213 is a spherical convex platform structure, the second concave portion 214 is correspondingly configured as a spherical cavity with an opening. In some examples, as shown in FIG. 3 and FIG. 4, the second convex portion 213 may be set as a T-shaped convex platform structure, the second concave portion 214 may be set as a T-shaped concave structure, and the two are fitted through the T-shaped structure. This type of connection has higher connection strength and detachment is not easy to occur. When the constraining apparatus is in a constrained state, the overall structural stability of the apparatus can be enhanced.

The two adjacent positioning pieces 21 are disposed in a fitting structure form between the convex portion and the concave portion, which can enhance the structural stability between the two adjacent positioning pieces when the positioning pieces 21 abut against each other, thereby enhancing the structural stability of the constraining apparatus during operation. Moreover, when the constraining apparatus is in a non-working state, the positioning pieces 21 can be fitted to each other to prevent movement of the positioning pieces 21. In this case, the positioning assembly 2 is integral, improving the overall structural integrity of the constraining apparatus.

As shown in FIG. 1 to FIG. 4, in some embodiments, the restricting piece 22 includes a body 221 and a third convex portion 223 connected to the body 221, where the third convex portion 223 protrudes in the first direction X with respect to the body 221 and encloses a first cavity 224, the accommodating space 4 is formed between the first cavities 224 of adjacent two of the positioning members 20, and the cushion assembly 3 is disposed in the first cavity 224.

The third convex portion 223 protrudes in the first direction X and encloses the first cavity 224. The third convex portion 223 may be configured as a multi-sided convex structure. For example, in FIG. 4, the third convex portion 223 is a three-sided convex structure, where two of the three sides are opposite in the second direction Y, and the another side connects the two opposite sides and is disposed close to the support assembly 11. The three-sided convex structure can ensure that the battery cell 10 can be constrained and positioned without affecting loading and unloading of the battery cell 10. This enhances the structural stability of the constraining apparatus constraining the battery cell 10. In particular, a supporting piece may be additionally disposed on a side, of the third convex portion 223, close to the support assembly 11, and the supporting piece is connected to the third convex portion 223 and supports the third convex portion 223. This can enhance the structural strength of the third convex portion 223 and enhance the structural stability of the constraining apparatus when the constraining apparatus constrains the battery cell 10.

The first cavity 224 is enclosed by the third convex portion 223, and the cushion assembly 3 is disposed in the first cavity 224. Thus, the third convex portion 223 can also constrain the cushion assembly 3 to a certain extent, which enhances stability of the connection between the third convex portion 223 and the positioning members 20.

As shown in FIG. 1 to FIG. 4, in some embodiments, the guide assembly 12 includes a plurality of guide shafts 121 extending in the first direction X, where the plurality of guide shafts 121 are spaced apart from each other in a direction perpendicular to the first direction X; and the positioning member 20 includes a plurality of movable portions 23, where each of the movable portions 23 is movably connected to its corresponding guide shaft 121.

The plurality of guide shafts 121 are spaced apart from each other in the direction perpendicular to the first direction X, which can be understood that some of the plurality of guide shafts 121 are spaced apart from each other in the second direction Y, and the rest of the guide shafts 121 are spaced apart from each other in a third direction Z. The first direction X, the second direction Y, and the third direction Z are perpendicular to each other.

The positioning member 20 includes a plurality of movable portions 23, where the movable portion 23 may be in various structural forms, for example, it may be a cylindrical through hole, a polygonal through hole, or the like, or certainly may be a semi-cylindrical through hole (as shown in FIG. 4), and the guide shaft 121 passes through the through hole. The shape of the movable portion 23 can be selected according to the shape of the guide shaft 121. For example, if the guide shaft 121 is a cylindrical strip structure, the movable portion 23 may be configured as a cylindrical through hole; or if the guide shaft 121 is configured as a square strip structure, the movable portion 23 may be configured as a square through hole.

The guide assembly 12 includes a plurality of guide shafts 121, which can enhance the stationarity of the positioning member 20 moving along the guide assembly 12 and enhance the structural stability of the constraining apparatus. In addition, the guide shafts 121 feature simple structure, ease of manufacturing and molding, and low cost.

As shown in FIG. 1 to FIG. 4, in some embodiments, the constraining apparatus further includes a holding assembly 5 and a jacking assembly 6. The holding assembly 5 is disposed on a side of the end plate assembly 13 close to the positioning member 20; and the jacking assembly 6 is disposed on the end plate assembly 13 and can move in the first direction X with respect to the end plate assembly 13. In the first state, the jacking assembly 6 is locked with the end plate assembly 13, and the holding assembly 5 abuts against the jacking assembly 6 and the positioning member 20; and in the second state, the jacking assembly 6 is locked with the end plate assembly 13, and the jacking assembly 6 is disengaged from the holding assembly 5.

The holding assembly 5 can push the positioning member 20 to move in the first direction X, which means that the holding assembly 5 can also move in the first direction X. When the holding assembly 5 moves in the first direction X, various positional relationships may be present between the holding assembly 5 and the guide assembly 12. For example, the holding assembly 5 may not be connected to the guide assembly 12 but is only displaced with respect to the guide assembly 12; or may be movably connected to the guide assembly 12, and moves in the first direction X along the guide assembly 12. If the holding assembly 5 is movably connected to the guide assembly 12, its movement stationarity can be better when the holding assembly 5 moves in the first direction X, which can enhance the overall structural stability of the constraining apparatus.

When the holding assembly 5 pushes the positioning member 20 to move and makes all adjacent positioning members 20 abut against each other, the constraining apparatus is in the first state, and in this case the holding assembly 5 can maintain a pressing force on the positioning assembly 2, where the pressing force can be transferred to all the positioning members 20 in sequence, such that the battery cell 10 can be constrained by the positioning members 20 so as to discharge the excess gas inside.

The holding assembly 5 is disposed on a side of the end plate assembly 13 close to the positioning member 20. The holding assembly 5 and the end plate assembly 13 are disposed in various forms. For example, the holding assembly 5 and the end plate assembly 13 may not be connected, and the two serve as two independent structures that do not interfere with each other; or the holding assembly 5 and the end plate assembly 13 are detachably connected, when the constraining apparatus is in the second state, the two are connected to each other, when the constraining apparatus is in the first state, the two are detached. Advantages of such arrangement lie in that the holding assembly 5 and the base 1 can be integrated when the constraining apparatus is in a non-working state, so as to avoid free movement of the holding assembly 5 and improve the structural integrity of the constraining apparatus.

Further, when the holding assembly 5 and the end plate assembly 13 are detachably connected, the two can have various connection forms, for example, threaded connection or snap-fit connection. For example, in this embodiment of this application, a convex portion is provided on a side of the holding assembly 5 facing the end plate assembly 13, and a concave portion matching the convex portion is provided on a side of the end plate assembly 13 facing the holding assembly 5, where the convex portion can be engaged with the concave portion, such that the holding assembly 5 can be fitted to the end plate assembly 13.

In some embodiments, the end plate assembly 13 includes a plurality of mounting portions 131, where the plurality of mounting portions 131 are spaced apart from each other, and the jacking assembly 6 is disposed on the mounting portion 131.

The jacking assembly 6 and the mounting portion 131 can have various structure forms.

In some examples, the jacking assembly 6 is a jacking rod, and the mounting portion 131 is a mounting hole, where the jacking rod and the mounting hole are in a clearance fit. In addition, in the direction perpendicular to the first direction X, a plurality of pin holes are provided on the jacking rod, and the plurality of pin holes are spaced part from each other in the first direction X. When the constraining apparatus is in the first state, the jacking assembly 6 abuts against the holding assembly 5, and in this case, a positioning pin is inserted in the pin hole, and the positioning pin abuts against the end plate assembly 13, and hinders the movement of the jacking assembly 6, thereby realizing the locking between the jacking assembly 6 and the end plate assembly 13. When the constraint state is released, the positioning pin can be pulled out, and the position of the jacking assembly 6 can be changed so as to disengage the jacking assembly 6 from the holding assembly 5. In this case, the constraining apparatus is in the second state.

In some other examples, the mounting portion 131 is a threaded hole with internal threads, the jacking assembly 6 is a screw rod with external threads, and the jacking assembly 6 and the mounting portion 131 are connected by threads. By forwardly screwing the jacking assembly 6, the jacking assembly 6 can be moved in the first direction X toward the holding assembly 5, until the holding assembly 5 and the positioning assembly 2 are compressed. In this case, the constraining apparatus is in the first state. Because the jacking assembly 6 and the mounting portion 131 are connected by threads, when the jacking assembly 6 stops, the abutment state of the jacking assembly 6 to the holding assembly 5 can be maintained, thereby maintaining the constraining force on the battery cell 10. When the constraint state is released, the jacking assembly 6 can be screwed in reverse to move in the first direction X away from the holding assembly 5, and the jacking assembly 6 and the holding assembly 5 are released from the abutting state. In this case, the constraining apparatus is in the second state.

A plurality of mounting portions 131 are spaced apart from each other, which can be understood that the plurality of mounting portions 131 can be spaced apart from each other in the third direction Z. When battery cells 10 of different heights are constrained, the jacking assemblies 6 can be disposed on the mounting portions 131 of different heights as required, such that when the jacking assemblies 6 abut against the holding assemblies 5, the pressures can be more evenly transferred to the positioning members 20, and the pressures can be evenly distributed to the battery cells 10, enhancing the effect of constraining the battery cells 10. Alternatively, a plurality of jacking assemblies 6 are mounted and disposed on the plurality of mounting portions 131, and the plurality of jacking assemblies 6 abut against the holding assemblies 5, which can improve the effect of compressing the holding assemblies 5, so as to improve the effect of constraining the battery cell 10. Similarly, the plurality of mounting portions 131 may alternatively be spaced apart from each other in the second direction Y, and the number and locations of the mounting portions 131 may be selected according to needs, which are not limited in this application.

Further, the holding assembly 5 includes a plurality of matching portions (not shown in the figure) disposed opposite the mounting portion 131 in the first direction X; in the first state, the jacking assembly 6 abuts against the matching portions; and in the second state, the jacking assembly 6 is disengaged from the matching portions.

The matching portion is in direct contact with the jacking assembly 6, and can be disposed based on the structure of the jacking assembly 6. For example, if the jacking assembly 6 is a cylindrical structure, the matching portion may be configured as a circular blind hole; or if the jacking assembly 6 is a square strip structure, the matching portion may be configured as a square blind hole.

The holding assembly 5 is provided with the matching portion that matches the jacking assembly 6, which can improve the abutment stability between the jacking assembly 6 and the holding assembly 5 during abutment against therebetween, reduce the possibility of the displacement of the jacking assembly 6, and improve the overall structural stability of the constraining apparatus.

When the constraining apparatus is in the first state, the matching portion abuts against the jacking assembly 6. In this case, great pressure is applied therebetween, and frequent pressure application may damage the holding assembly 5. Therefore, a wear-resistant piece may be mounted on the matching portion so as to reduce the damage to the holding assembly 5. The wear-resistant piece can be made of various materials, for example, wear-resistant rubber, wear-resistant resin, or ceramic materials. Certainly, a flexible member may also be provided at an end of the jacking assembly 6 in contact with the matching portion, so as to reduce damage to the holding assembly 5.

Figure 5:
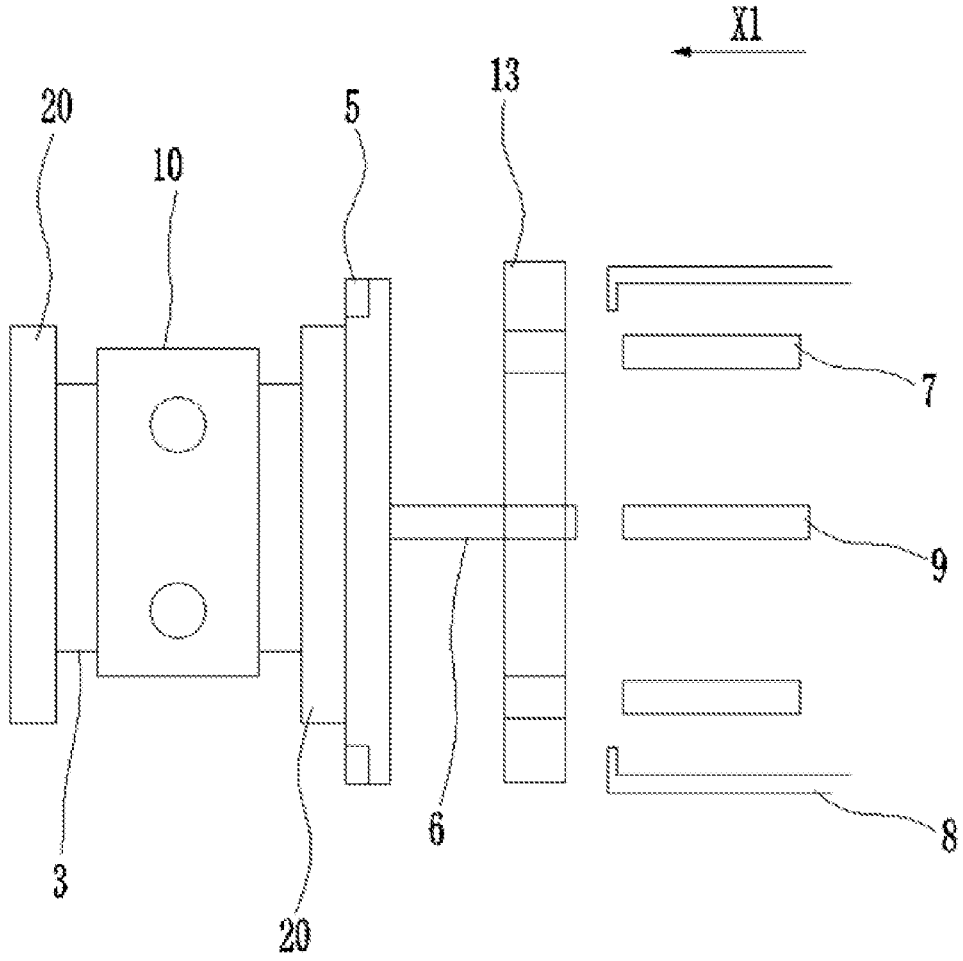
FIG. 5 is a schematic structural diagram of a constraining device according to some embodiments of this application.

FIG. 5 is a schematic structural diagram of a constraining device according to some embodiments of this application;

An embodiment of this application further provides a constraining device. As shown in FIG. 1 to FIG. 5, the constraining device includes the constraining apparatus according to any one of the embodiments and an a pressurizing apparatus 7, where the pressurizing apparatus 7 is configured to exert an acting force on the positioning assembly 2 in a first sub-direction X1, such that the constraining apparatus is in the first state and adjacent two of the positioning members 20 abut against each other. The first sub-direction X1 is unidirectional, and the first sub-direction X1 is parallel to the first direction X.

The constraining device provided in this embodiment of this application includes a pressurizing apparatus 7. When the pressurizing apparatus 7 exerts an acting force on the positioning assembly 2, the pressurizing apparatus 7 can be connected to the positioning assembly 2. The connection therebetween may be in various forms, for example, direct connection, or indirect connection. For such indirect connection, a third connecting piece is disposed to connect the pressurizing apparatus 7 and the positioning assembly 2. The pressurizing apparatus 7 is disposed to exert pressure on the positioning assembly 2, such that human intervention can be reduced. This raises the automation level of the constraining device and improves the constraining efficiency.

Further, in some examples, the constraining apparatus further includes the holding assembly 5 and the jacking assembly 6; and the constraining device further includes a screw tightening apparatus 9, where the screw tightening apparatus 9 is configured to connect the jacking assembly 6, so as to drive the jacking assembly 6 to rotate and push the holding assembly 5 to move in the first sub-direction X1.

The jacking assembly 6 can be threaded with both the screw tightening apparatus 9 and the end plate assembly 13. An end of the jacking assembly 6 away from the holding assembly 5 may be provided with internal threads, and an end of the screw tightening apparatus 9 facing the end plate assembly 13 may be provided with external threads, such that the screw tightening apparatus 9 can be screwed and fixedly connected to the jacking assembly 6 by rotating itself. After the two are fixedly connected, the screw tightening apparatus 9 can drive the jacking assembly 6 to rotate accordingly and make the jacking assembly 6 move back and forth in the first direction X through its own forward rotation and reverse rotation. In this way, the jacking assembly 6 can abut against the holding assembly 5 or no longer abuts against the holding assembly 5, such that the constraining apparatus can switch between the first state and the second state. In addition, the screw tightening apparatus 9 can also release the connection with the jacking assembly 6 by rotating itself.

Advantages of disposing the screw tightening apparatus 9 lie in that after the pressurizing apparatus 7 compresses the positioning assembly 2, the holding assembly 5 can be compressed against one end of the positioning assembly 2 through matching of the screw tightening apparatus 9 and the jacking assembly 6, and the compressing effect is maintained through the fixing action of the threaded connection. In this case, the pressurizing apparatus 7 can be removed, and only the screw tightening apparatus 9 applies pressure on the positioning assembly 2, which can reduce the power consumption of the constraining device.

As shown in FIG. 1 to FIG. 5, in some embodiments, the constraining device further includes a pressure relief apparatus 8, where the pressure relief apparatus 8 is configured to exert an acting force on the positioning assembly 2 in a direction opposite the first sub-direction X1, such that the constraining apparatus is in the second state and the positioning members 20 are spaced apart from each other in the first direction X.

When the pressure relief apparatus 8 applies a force on the positioning assembly 2, the pressure relief apparatus 8 can be connected to the positioning assembly 2. The pressure relief apparatus 8 and the positioning assembly 2 can have various connection forms, for example, direct connection or indirect connection. For such indirect connection, a fourth connecting piece is disposed to connect the pressure relief apparatus 8 and the positioning assembly 2.

The pressure relief apparatus 8 is disposed such that human intervention can be reduced in releasing the battery cell 10 by the constraining apparatus. This raises the automation level of the constraining device and improves the operating efficiency.

In a specific embodiment of this application, as shown in FIG. 1 to FIG. 4, the constraining apparatus includes a base 1, a positioning assembly 2, and a cushion assembly 3. The base 1 includes a support assembly 11, a guide assembly 12, and two end plate assemblies 13, where the two end plate assemblies 13 are respectively connected to two ends of the support assembly 11 that are opposite each other in a first direction X. The guide assembly 12 extends in the first direction X and is connected to the two end plate assemblies 13. The positioning assembly 2 includes a plurality of positioning members 20 arranged in sequence in the first direction X and located between two end plate assemblies 13, where the plurality of positioning members 20 are movably connected to the guide assembly 12 in the first direction X. The positioning member 20 includes two positioning pieces 21 and a restricting piece 22, where the two positioning pieces 21 are disposed opposite each other in the second direction Y, and are movably connected to the guide assembly 12 in the first direction X, and the second direction Y is perpendicular to the first direction X. The restricting piece 22 is detachably connected between the two positioning pieces 21. The cushion assembly 3 is disposed on the restricting piece 22, and an accommodating space 4 is formed between the restricting pieces 22 of adjacent two of the positioning members 20, and the cushion assembly 3 is configured to be disposed between the restricting pieces 22 and the battery cells 10. The constraining apparatus includes a first state and a second state, where in the first state, the two adjacent positioning pieces 21 of adjacent two of the positioning members 20 abut against each other, such that an accommodating space 4 for accommodating a battery cell 10 is formed between the restricting pieces 22 of the adjacent two of the positioning members 20, and the cushion assembly 3 is configured to abut against the battery cell 10 and positioning members 20; and in the second state, the positioning pieces 21 of the plurality of positioning members 20 are spaced apart from each other in the first direction X.

The constraining apparatus provided in this embodiment of this application includes a first state and a second state. The first state is a state of exerting constraint on the battery cell 10 by the constraining apparatus, and the second state is a state of releasing constraint on the battery cell. The constraining apparatus can switch between the first state and the second state by changing positions of the positioning members 20. When the constraining apparatus is in the first state, the positioning members 20 abut against each other, and the battery cell 10 is compressed, which prompts the battery cell 10 to discharge gas. When the constraining apparatus is in the second state, gaps are present between the positioning members 20, the battery cell 10 is not subject to the constraining force, and the battery cell 10 can be easily loaded and unloaded.

Under the condition that the constraining apparatus of this embodiment of this application is in the first state, the cushion assembly 3 abuts against the battery cell 10 and the positioning members 20, and the cushion assembly 3 has an elastic force, which can be converted into a constraining force on the battery cell 10. In this case, the battery cell 10 is always subject to the constraining force applied by the cushion assembly 3 in the constraining process, and the gas inside the battery cell 10 can be fully discharged. The constraining apparatus of this embodiment of this application greatly improves the effect of constraining the battery cell 10 and decreases the defect rate of producing battery cells 10.

In addition, the positioning member 20 includes a restricting piece 22 and two positioning pieces 21, and the restricting piece 22 is detachably connected to the two positioning pieces 21. Such detachable connection facilitates the disassembly of the restricting piece 22. For different types of battery cells 10, the shape of the constraining apparatus can be changed to adapt the accommodating space 4 to the battery cells 10, such that the battery cells 10 of different types can be replaced quickly. This improves the versatility and convenience of use of the constraining apparatus.

Although this application has been described with reference to the preferred embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. A constraining apparatus for constraining a battery cell comprising:

a base, comprising a support assembly, a guide assembly, and two end plate assemblies, wherein the two end plate assemblies are respectively connected to two ends of the support assembly that are opposite each other in a first direction, and the guide assembly extends in the first direction and is connected to the two end plate assemblies;

a positioning assembly, comprising a plurality of positioning members arranged in sequence in the first direction and located between the two end plate assemblies, wherein the plurality of positioning members are movably connected to the guide assembly in the first direction, and adjacent two of the positioning members are fitted to each other in the first direction; and a cushion assembly, disposed on at least one of two sides of the positioning member that are opposite each other in the first direction;

wherein the constraining apparatus comprises a first state and a second state; in the first state, adjacent two of the positioning members abut against each other, such that an accommodating space for accommodating a battery cell is formed between the adjacent two of the positioning members, and the cushion assembly is configured to abut against the battery cell and the positioning members; and in the second state, the plurality of positioning members are spaced apart from each other in the first direction; and wherein each positioning member of the plurality of positioning members comprises:

two positioning pieces, disposed opposite each other in a second direction, wherein the two positioning pieces are movably connected to the guide assembly in the first direction, and the second direction is perpendicular to the first direction; and a restricting piece, detachably connected between the two positioning pieces, wherein the cushion assembly is disposed on the restricting piece;

wherein an accommodating space is formed between the restricting pieces of adjacent two of the positioning members, and the cushion assembly is configured to be disposed between the restricting pieces and the battery cells.

2. The constraining apparatus according to claim 1, wherein the positioning assembly is provided in plurality, wherein the plurality of positioning assemblies are disposed successively in a second direction, and the second direction is perpendicular to the first direction.

3. The constraining apparatus according to claim 1, wherein the restricting piece comprises a body and two first convex portions connected to the body, the two first convex portions respectively protrude in a direction towards the positioning pieces with respect to the body, and the body is connected to the cushion assembly; and each positioning piece of the two positioning pieces comprises a main body and first concave portions, wherein the first concave portion is depressed in a direction away from the restricting piece with respect to the main body, and the first concave portions are fitted to the first convex portions.

4. The constraining apparatus according to claim 1, wherein each positioning piece of the two positioning pieces comprises:

a main body;

a second convex portion, connected to the main body and protruding in the first direction with respect to the main body; and a second concave portion, connected to the main body, depressed in the first direction with respect to the main body, and disposed opposite the second convex portion in the first direction; and in the first direction, the second convex portion of one of the two adjacent positioning pieces is fitted to the second concave portion of the other one of the two adjacent positioning pieces.

5. The constraining apparatus according to claim 1, wherein the restricting piece comprises a body and a third convex portion connected to the body, wherein the third convex portion protrudes in the first direction with respect to the body and encloses a first cavity, the accommodating space is formed between the first cavities of adjacent two of the positioning members, and the cushion assembly is disposed in the first cavity.

6. The constraining apparatus according to claim 3, wherein:

a plurality of through holes are provided on the body; and a plurality of protrusions are provided on a side of the cushion assembly facing the body and embedded in the through holes.

7. The constraining apparatus according to claim 1, wherein the guide assembly comprises a plurality of guide shafts extending in the first direction, and the plurality of guide shafts are spaced apart from each other in a direction perpendicular to the first direction; and the positioning member comprises a plurality of movable portions, and each of the movable portions is movably connected to its corresponding guide shaft.

8. A constraining apparatus for constraining a battery cell comprising:

a base, comprising a support assembly, a guide assembly, and two end plate assemblies, wherein the two end plate assemblies are respectively connected to two ends of the support assembly that are opposite each other in a first direction, and the guide assembly extends in the first direction and is connected to the two end plate assemblies;

a positioning assembly, comprising a plurality of positioning members arranged in sequence in the first direction and located between the two end plate assemblies, wherein the plurality of positioning members are movably connected to the guide assembly in the first direction, and adjacent two of the positioning members are fitted to each other in the first direction; and a cushion assembly, disposed on at least one of two sides of the positioning member that are opposite each other in the first direction;

wherein the constraining apparatus comprises a first state and a second state; in the first state, adjacent two of the positioning members abut against each other, such that an accommodating space for accommodating a battery cell is formed between the adjacent two of the positioning members, and the cushion assembly is configured to abut against the battery cell and the positioning members; and in the second state, the plurality of positioning members are spaced apart from each other in the first direction, wherein the constraining apparatus further comprises:

a holding assembly, disposed on a side of the end plate assembly close to the positioning member; and a jacking assembly, disposed on the end plate assembly and capable of moving in the first direction with respect to the end plate assembly;

wherein in the first state, the jacking assembly is locked with the end plate assembly, and the holding assembly abuts against the jacking assembly and the positioning member; and in the second state, the jacking assembly is locked with the end plate assembly, and the jacking assembly is disengaged from the holding assembly.

9. The constraining apparatus according to claim 8, wherein the holding assembly is movably connected to the guide assembly in the first direction.

10. The constraining apparatus according to claim 8, wherein in the second state, the holding assembly is engaged with the end plate assembly.

11. The constraining apparatus according to claim 8, wherein the end plate assembly comprises a plurality of mounting portions, the plurality of mounting portions are spaced apart from each other, and the jacking assembly is disposed on the mounting portion.

12. The constraining apparatus according to claim 11, wherein the holding assembly comprises a plurality of matching portions disposed opposite the mounting portions in the first direction;

wherein in the first state, the jacking assembly abuts against the matching portion; and in the second state, the jacking assembly is disengaged from the matching portion.

13. A constraining device, comprising:

the constraining apparatus according to claim 1; and a pressurizing apparatus, wherein the pressurizing appa-
ratus is configured to exert an acting force on the
positioning assembly in a first heading, such that the
constraining apparatus is in the first state and adjacent
two of the positioning members abut against each other,
and the first heading is parallel to the first direction.

14. The constraining device according to claim 13,
wherein the constraining device further comprises:

a pressure relief apparatus, wherein the pressure relief
apparatus is configured to exert an acting force on the
positioning assembly in a second heading opposite the
first heading, such that the constraining apparatus is in
the second state and the positioning members are
spaced apart from each other in the first direction.

15. The constraining device according to claim 13, wherein:

the constraining apparatus further comprises a holding
assembly and a jacking assembly; and the constraining device further comprises a screw tight-
ening apparatus, wherein the screw tightening apparatus is configured to connect to the jacking assembly, so
as to drive the jacking assembly to rotate and push the
holding assembly to move in the first heading.

\*  \*  \*  \*  \*